(12) United States Patent
Juengling et al.

(10) Patent No.: US 12,365,394 B2
(45) Date of Patent: Jul. 22, 2025

(54) LONGITUDINAL MEMBER FOR A REAR PART OF A MOTOR VEHICLE, AND REAR PART FOR A MOTOR VEHICLE

(71) Applicant: Bayerische Motoren Werke Aktiengesellschaft, Munich (DE)

(72) Inventors: Maximilian Juengling, Munich (DE); Georg Lange, Zwickau (DE); Manuel Riedl, Weil (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 422 days.

(21) Appl. No.: 18/013,049

(22) PCT Filed: May 31, 2021

(86) PCT No.: PCT/EP2021/064491
§ 371 (c)(1),
(2) Date: Dec. 27, 2022

(87) PCT Pub. No.: WO2022/002505
PCT Pub. Date: Jan. 6, 2022

(65) Prior Publication Data
US 2023/0242183 A1    Aug. 3, 2023

(30) Foreign Application Priority Data

Jun. 30, 2020    (DE) .................... 10 2020 117 193.5

(51) Int. Cl.
*B62D 25/08* (2006.01)
*B62D 25/16* (2006.01)

(52) U.S. Cl.
CPC .......... *B62D 25/088* (2013.01); *B62D 25/16* (2013.01)

(58) Field of Classification Search
CPC .............................. B62D 25/088; B62D 25/16
See application file for complete search history.

(56) References Cited

U.S. PATENT DOCUMENTS

| | | |
|---|---|---|
| 5,456,517 A | 10/1995 | Kalian et al. |
| 6,109,653 A | 8/2000 | Maruyama et al. |
| (Continued) | | |

FOREIGN PATENT DOCUMENTS

| | | |
|---|---|---|
| DE | 200 22 516 U1 | 12/2001 |
| DE | 103 42 807 A1 | 4/2004 |
| (Continued) | | |

OTHER PUBLICATIONS

FR 3121190 A1 with English Translation (Year: 2022).*
(Continued)

*Primary Examiner* — Lori Lyjak
(74) *Attorney, Agent, or Firm* — Crowell & Moring LLP

(57) ABSTRACT

A longitudinal member for a rear part of a motor vehicle includes an attachment region in which a support for a damper designed to dampen vibrations of a wheel of the motor vehicle can be fixed to the longitudinal member. The attachment region has a plurality of fastening points for connecting elements. The fastening points each have receiving openings into which a section of one of the connecting elements can be inserted in order to fix the support in the attachment region. Central axes of the receiving openings extend substantially in the transverse direction of the longitudinal member. The longitudinal member has a support element which is located above the fastening points in the vertical direction of the longitudinal member and on which the damper device can be supported in the lifting direction.

13 Claims, 4 Drawing Sheets

(56) References Cited

U.S. PATENT DOCUMENTS

| | | |
|---|---|---|
| 10,494,031 B2 | 12/2019 | Masuda et al. |
| 2004/0051292 A1 | 3/2004 | Tamura |
| 2017/0174265 A1 | 6/2017 | Maruyama et al. |

FOREIGN PATENT DOCUMENTS

| | | | | |
|---|---|---|---|---|
| DE | 102 57 259 A1 | 7/2004 | | |
| DE | 10 2006 041 664 A1 | 3/2008 | | |
| DE | 10 2006 044 107 A1 | 3/2008 | | |
| DE | 10 2008 050 297 A1 | 5/2009 | | |
| DE | 10 2013 002 701 A1 | 3/2014 | | |
| DE | 10 2016 015 016 A1 | 6/2017 | | |
| GB | 2496504 A | * | 5/2013 | ............. B60G 11/58 |

OTHER PUBLICATIONS

International Search Report (PCT/ISA/210) issued in PCT Application No. PCT/EP2021/064691 dated Sep. 1, 2021 with English translation (four (4) pages).

German-language Written Opinion (PCT/ISA/237) issued in PCT Application No. PCT/EP2021/064691 dated Sep. 1, 2021 (five (5) pages).

German-language Office Action issued in German Application No. 10 2020 117 193.5 dated May 4, 2021 (eight (8) pages).

* cited by examiner

LONGITUDINAL MEMBER FOR A REAR PART OF A MOTOR VEHICLE, AND REAR PART FOR A MOTOR VEHICLE

BACKGROUND AND SUMMARY

The invention relates to a longitudinal member for a rear part of a motor vehicle, the longitudinal member having an attachment region. In the attachment region, a mounting for a damper device designed to damp vibrations of a wheel of the motor vehicle can be fixed to the longitudinal member. The attachment region has a plurality of fastening points for connecting elements. The fastening points each have receiving openings into which a respective section of one of the connecting elements can be inserted in order to fix the mounting in the attachment region. Central axes of the receiving openings extend substantially in the transverse direction of the longitudinal member. Furthermore, the invention relates to a rear part for a motor vehicle, which has at least one such longitudinal member.

In a motor vehicle marketed by the automobile manufacturer Volvo under the designation XC 90, a mounting designed as a supporting bearing for a damper in the rear part of the motor vehicle is screwed to a body panel of a longitudinal member at four fastening points. The supporting bearing, which is used to support the damper for a rear wheel of the motor vehicle, has two fastening eyes arranged above one another in the vertical direction of the longitudinal member on both sides of the damper for this purpose, through which fastening eyes the screws screwed into the body panel are led. Lever arms or supporting arms of the supporting bearing extend obliquely upward from these fastening eyes, based on the lifting direction or working direction of the damper, and toward the vehicle outer side. Here, the supporting arms reach as far as an upper end region of the damper. In this upper end region, which is arranged above the longitudinal member, the damper is embraced by a holding region of the supporting bearing.

On the one hand, this design entails forces which are introduced into the supporting bearing during operation of the damper having to be passed on or diverted via the lever arms or supporting arms toward the fastening points at which the supporting bearing is screwed to the body panel of the longitudinal member. This is unfavorable with regard to the introduction of force into the longitudinal members via the fastening points from forces occurring during operation of the damper.

The configuration of the supporting bearing also entails the screws which are screwed into the body panel of the longitudinal member in the transverse direction of the longitudinal member and thus parallel to the vehicle transverse axis not being easily accessible despite their arrangement underneath the upper end region of the damper. At the top in this design, the damper is supported on a wheel arch, which is fastened to the longitudinal member. This is disadvantageous with regard to the robustness of the supporting of the damper in the vertical direction or in its working direction or lifting direction.

Furthermore, the supporting bearing used in the Volvo XC90 is complicated to manufacture and with regard to assembly.

It is an object of the invention to provide a longitudinal member of the type mentioned at the beginning which permits low-cost and simultaneously robust fixing of the damper device, and to specify a rear part for a motor vehicle having at least one such longitudinal member.

According to the invention, this object is achieved by a longitudinal member and by a rear part having the features of the independent claims. Advantageous embodiments of the invention are the subject matter of the dependent patent claims and the description.

A longitudinal member according to the invention for a rear part of a motor vehicle has an attachment region. In the attachment region, a mounting for a damper device can be fastened to the longitudinal member. The damper device is designed to damp vibrations of a wheel of the motor vehicle. The attachment region has a plurality of fastening points for connecting elements. The fastening points have respective receiving openings, into which a respective section of one of the connecting elements can be inserted to fix the mounting in the attachment region. Central axes of the receiving openings extend here substantially in the transverse direction of the longitudinal member. The longitudinal member has a support element, which is located above the fastening points in the vertical direction of the longitudinal member. The damper device can be supported on this support element in the lifting direction.

The lifting direction or working direction of the damper device is the direction in which components of the damper device are moved relative to one another during the operation of the same in order to damp vibrations which occur or are produced as a result of movements of the wheel. The damper device is therefore supported on the support element in this direction when the damper device is fastened to the longitudinal member by means of the mounting in the attachment region. As a result of supporting the damper in the vertical direction and thus, in the installed position of the longitudinal member in the motor vehicle, substantially parallel to the vehicle vertical axis, stresses occurring during operation of the damper device can be absorbed particularly well by the longitudinal member.

This is based in particular on the fact that the support element of the longitudinal member can be loaded particularly well and is thus associated with a very good supporting action in the vertical direction of the longitudinal member and accordingly in the lifting direction of the damper device. Furthermore, it is possible to dispense with supporting the damper device, for example in a wheel arch or the like, which can be fastened to the longitudinal member in the motor vehicle. This is advantageous with regard to the low-cost fixing of the damper device.

Since the support element is provided by the longitudinal member, a structural component that is present in any case in the rear part of the motor vehicle can also be used at the same time to support the damper device in its working direction or lifting direction. Consequently, low-cost and simultaneously robust fixing of the damper device to the longitudinal member is made possible.

In addition, as a result of arranging the fastening points underneath the support element, which belongs to the longitudinal member, it is possible to ensure that the receiving openings of the fastening points into which the respective sections of the connecting elements can be inserted in the transverse direction of the longitudinal member and thus, in the installed position of the longitudinal member, substantially parallel to the vehicle transverse axis, can very easily be reached and are accessible for the mounting of the connecting elements.

Preferably, the support element is formed integrally with the longitudinal member. As a result, it is not even necessary to connect a separate component to the longitudinal member to provide the support element. Instead, the support element is formed directly at the same time during the manufacture of the longitudinal member.

The support element can be provided integrally with the longitudinal member in a particularly low-cost manner if the longitudinal member is formed as a cast component. Here, an aluminum alloy or a steel can in particular be used as a material.

By forming the longitudinal member as a cast component, the support element can thus be provided particularly simply in one piece with the longitudinal member. Then, no additional component is needed to support the damper device in the vertical direction or lifting direction. Instead, the support element is an integral constituent part of the longitudinal member. In addition, the latter is conducive to a high load-bearing ability of the support element.

The support element preferably has a plate-like central region which, in the longitudinal direction of the longitudinal member, is arranged between the fastening points. As a result, the fastening points can be reached easily even when the damper device is fastened to the longitudinal member by means of the mounting in the attachment region.

Preferably, a passage opening, into which an extension at the end of the damper device can be inserted, is formed in the central region. In this way, the damper device can be positioned very simply and securely before the damper device is fixed to the longitudinal member by means of the mounting or supporting device in the attachment region during the mounting. Furthermore, the mounting of the damper device can be implemented particularly simply by inserting the extension into the passage opening since, as a result of the introduction of the extension into the passage opening, a certain level of pre-positioning of the damper device can be achieved.

Preferably, the receiving openings of the fastening points are formed in respective receiving bushes, which protrude from a side wall of the longitudinal member in the transverse direction of the longitudinal member. In this way, particularly robust and load-bearing fastening points are provided in the form of the receiving bushes. Consequently, highly load-bearing fixing of the mounting and, by means of the latter, the damper device on the longitudinal member is also achievable via the receiving bushes, by the sections of the connecting elements being introduced into the receiving bushes. Preferably, the receiving bushes are formed integrally with the longitudinal member. Thus, the receiving bushes can also be provided in a particularly low-cost manner directly during the production of the longitudinal member.

In particular, the receiving bushes can have a respective screw thread. This makes it possible, as a connecting element for fixing the mounting in the attachment region and thus for attaching the damper device to the longitudinal member, to screw bolts into the screw threads of the respective receiving bush. This is conducive to bringing about a connection of the mounting to the longitudinal member which is particularly load-bearing and at the same time can be detached if necessary.

Preferably, the support element has plate-like edge regions. Here, a first edge region is supported on a first receiving bush, and a second edge region is supported on a second receiving bush. In this way, it is ensured that the edge regions of the support element are arranged in very close proximity to the fastening points. As a result of this compact formation of the attachment region for the mounting, which is designed to fix the damper device to the longitudinal member, a very good introduction of force into the longitudinal member can be achieved during operation of the damper device.

In particular, the first plate-like edge region of the support element can be formed integrally with the first receiving bush, and the second plate-like edge region of the support element can be formed integrally with the second receiving bush. Thus, a particularly intimate connection of the support element to the receiving bushes is produced, which is conducive to a high load-bearing ability. This is advantageous with regard to a very stiff attachment of the mounting to the longitudinal member and thus very good fixing of the damper device to the longitudinal member.

In particular, at least two of the receiving bushes can be arranged one above another in the vertical direction of the longitudinal member, underneath the respective edge region. This is also conducive to a particularly high load-bearing ability of the attachment region for the mounting.

The at least two receiving bushes arranged one above another in the vertical direction of the longitudinal member can be connected to each other in particular in a contact region or merge into each other in the contact region. As a result, the receiving bushes support one another, which is beneficial to the robust or load-bearing fixing of the mounting to the longitudinal member.

Preferably, at least one of the receiving bushes is supported by means of at least one rib on the side wall of the longitudinal member. This is also advantageous with regard to the load-bearing ability of the at least one receiving bush. In addition, the at least one rib can also be provided simply and at low cost in the preferably provided formation of the longitudinal member as a cast component.

A rear part according to the invention for a motor vehicle has at least one longitudinal member according to the invention. As a result, the longitudinal member which has to be provided in the rear part of the motor vehicle in any case and which has the support element can be used to support the damper device in the vertical direction of the longitudinal member or in the lifting direction of the damper device.

Preferably, the rear part comprises a wheel arch element, which is fastened to the longitudinal member. Here, in the direction of the vehicle vertical axis or in the vertical direction of the longitudinal member, the support element of the longitudinal member is spaced further apart from an upper end region of the wheel arch element than from a lower end region of the wheel arch element. This has the consequence that the fastening points arranged underneath the support element in the vertical direction of the longitudinal member are also arranged comparatively far down in the wheel arch, which is delimited in some regions by the wheel arch element. As a result, the fastening points are particularly easily accessible during mounting and/or removal of the damper device.

In particular, it is possible to provide that, even when a wheel arch outer part, in particular a wheel arch outer panel, is fastened to the wheel arch element, the fastening points in the transverse direction of the longitudinal member and thus parallel to the vehicle transverse axis are directly accessible for a tool extending in the transverse direction, by means of which the connecting elements can be mounted or released. It is therefore necessary for preferably only the wheel to be removed in order to reach the connecting elements simply with the tool, in particular a screwing tool, extending in the transverse direction and attached in the transverse direction.

Preferably, in the rear part, the damper device is fastened to the longitudinal member in the attachment region by means of the mounting. In this way, the damper device is supported in a high load-bearing manner in the vertical direction of the longitudinal member and thus substantially parallel to the vehicle vertical axis on a component of the longitudinal member, specifically on the support element of the longitudinal member.

The advantages and preferred embodiments described for the longitudinal member according to the invention also apply to the rear part according to the invention and vice versa.

Further features of the invention emerge from the claims, the figures and the figure description. The features and feature combinations described above in the description and the features and feature combinations mentioned below in the figure description and/or shown on their own in the figures can be used not only in the respectively specified combination but also in other combinations or on their own.

The invention will now be explained in more detail by using a preferred exemplary embodiment and with reference to the drawings.

DETAILED DESCRIPTION OF THE DRAWINGS

Figure 1:
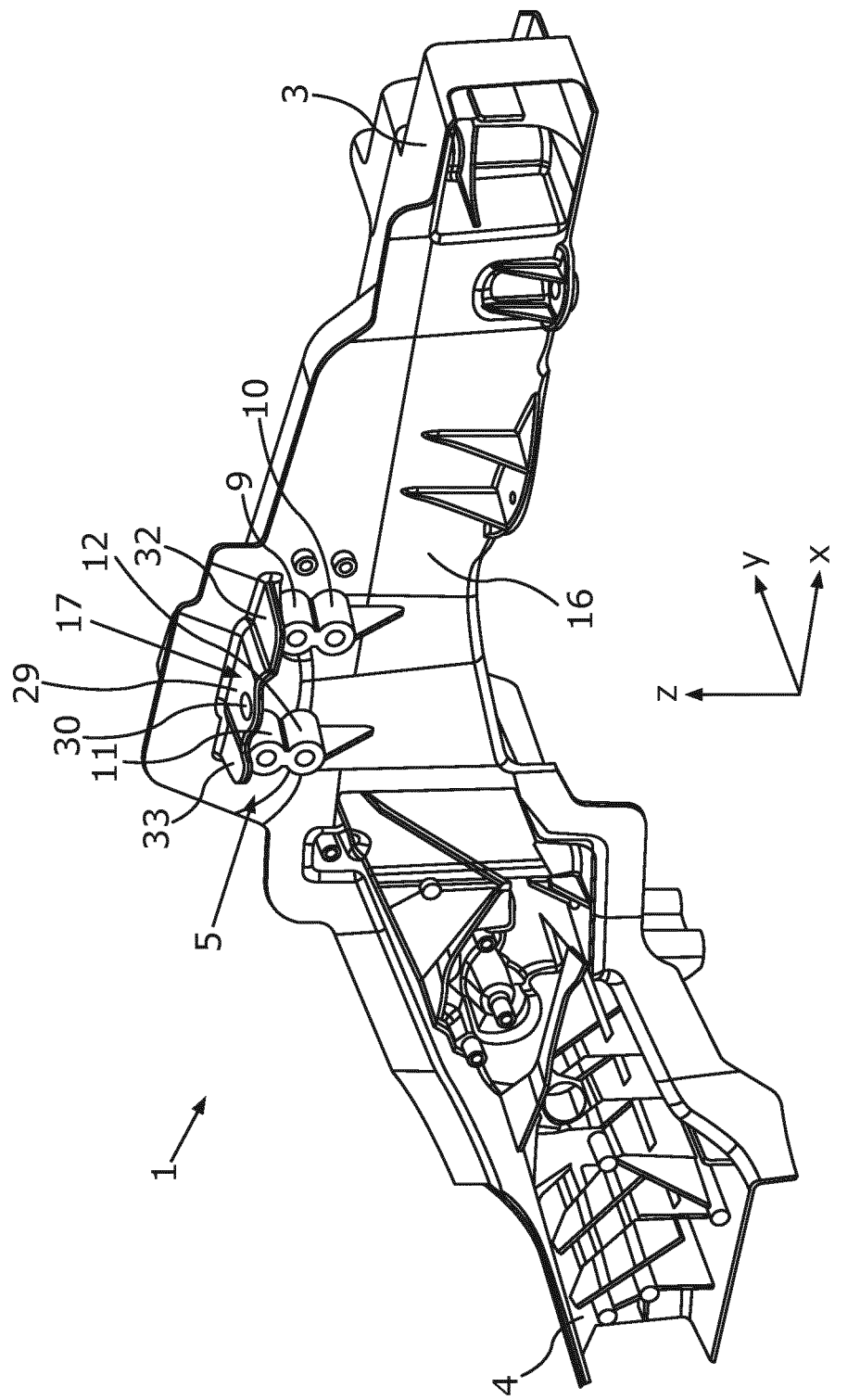
FIG. 1 is a schematic perspective view of a longitudinal member for a rear part of a motor vehicle designed as a passenger car.

A rear longitudinal member 1 for a motor vehicle is shown schematically and in a perspective view in FIG. 1. In the present case, the longitudinal member 1 is provided for arrangement in a rear part 2 of the motor vehicle, components of the rear part 2 being shown in a perspective view in FIG. 2.

The longitudinal member 1 shown in FIG. 1 extends substantially in the direction of the vehicle longitudinal axis x, which, in the same way as the vehicle vertical axis z and the vehicle transverse axis y, is illustrated by a coordinate system in FIG. 1. Accordingly, a rear end region 3 of the longitudinal member 1 is closer to a rear of the motor vehicle, while a front end region 4 of the longitudinal member 1 is spaced further from the rear of the motor vehicle.

Figure 4:
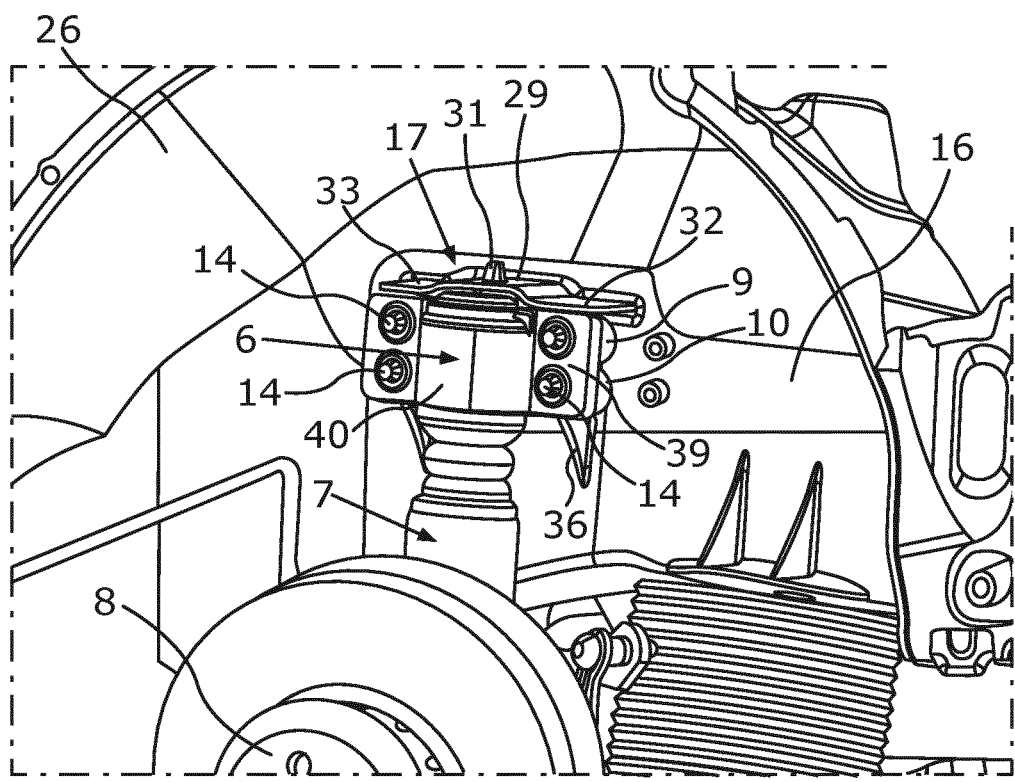
FIG. 4 shows the longitudinal member according to FIG. 3, wherein the damper is fixed to the longitudinal member in the attachment region by means of the mounting.
Figure 5:
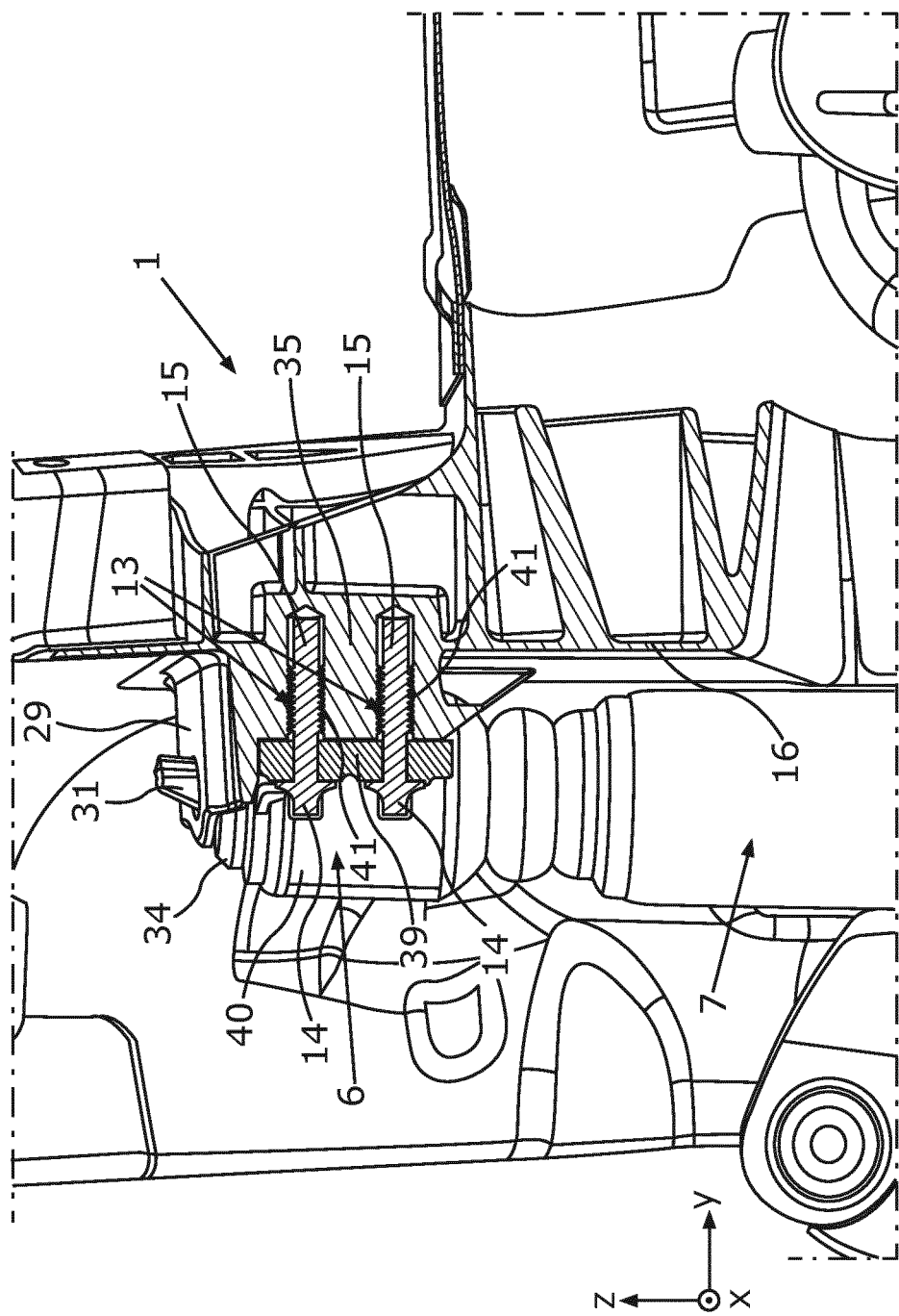
FIG. 5 shows a partially sectioned illustration of the longitudinal member with the damper fastened to the longitudinal member according to FIG. 4.

The longitudinal member 1 has an attachment region 5 for a mounting in the form of a supporting bearing 6, which is illustrated in a perspective view in FIG. 4 and partly sectioned in FIG. 5. The supporting bearing 6 serves to attach a damper device or a damper 7 to the longitudinal member 1 (compare FIG. 4 and FIG. 5)

The damper 7 is provided to damp vibrations which occur during the movement of a wheel (rear in the present case) of the motor vehicle. Part of a wheel carrier 8 for the rear wheel of the motor vehicle is shown in a detail in FIG. 4. Vibrations of the wheel of the motor vehicle that can be fastened (not shown) to this wheel carrier 8 are damped in a manner known per se by means of the damper 7.

The attachment region 5 comprises a plurality of fastening points which, in the present case, are formed as receiving bushes 9, 10, 11, 12 formed integrally with the longitudinal member 1. As can be seen in particular from a combined view of FIG. 4 with FIG. 5, to fasten the supporting bearing 6 for the damper 7 to the longitudinal member 1, connecting elements in the form of screw bolts 13 can be screwed into a respective receiving opening of the receiving bushes 9, 10, 11, 12.

Bolt heads 14 of the screw bolts 13 can be seen in FIG. 4, only some of the bolt heads 14 being provided with a designation in FIG. 4 for reasons of clarity. A section of the respective screw bolt 13 in the form of a respective shaft 15 is screwed into each one of the receiving openings, which are formed in the receiving bushes 9, 10, 11, 12.

In this regard, in particular from a combined view of FIG. 1 and FIG. 5, it can be seen that central axes of the receiving openings, which are shaft-like or formed in the manner of a respective blind hole, extend substantially in the transverse direction of the longitudinal member 1 and thus, when installed in the longitudinal member 1, substantially parallel to the vehicle transverse axis y. The mounting in the form of the supporting bearing 6 which serves to fasten the damper 7 to the longitudinal member 1 is thus screwed to the longitudinal member 1 in the direction of the vehicle transverse axis y.

The receiving bushes 9, 10, 11, 12 in the present case are formed integrally with the longitudinal member 1, because of the preferably provided design of the longitudinal member 1 as a cast component.

It can further be seen from FIG. 1 that the receiving bushes 9, 10, 11, 12 protrude from a side wall 16 of the longitudinal member 1 in the transverse direction of the longitudinal member 1 and thus parallel to the vehicle transverse axis y.

In the vertical direction of the longitudinal member 1 and thus parallel to the vehicle vertical axis z, above the fastening points for the supporting bearing 6 provided by the receiving bushes 9, 10, 11, 12 in the present case, a support element 17 is provided or formed in the attachment region 5. The support element 17, molded on the side wall 16 in the manner of a plateau, is likewise formed integrally or in one piece with the longitudinal member 1 in the present case.

This support element 17 serves to support the damper 7 in the vertical direction of the longitudinal member 1 and thus substantially parallel to the vehicle vertical axis z. In FIG. 5, the vehicle vertical axis z simultaneously indicates a lifting direction or working direction of the damper 7. Components of the damper 7, for example in the form of a piston rod and a cylinder of the damper 7, move relative to each other in this lifting direction or working direction if vibrations which occur or are produced on account of movements of the wheel of the motor vehicle are damped by means of the damper 7.

Figure 2:
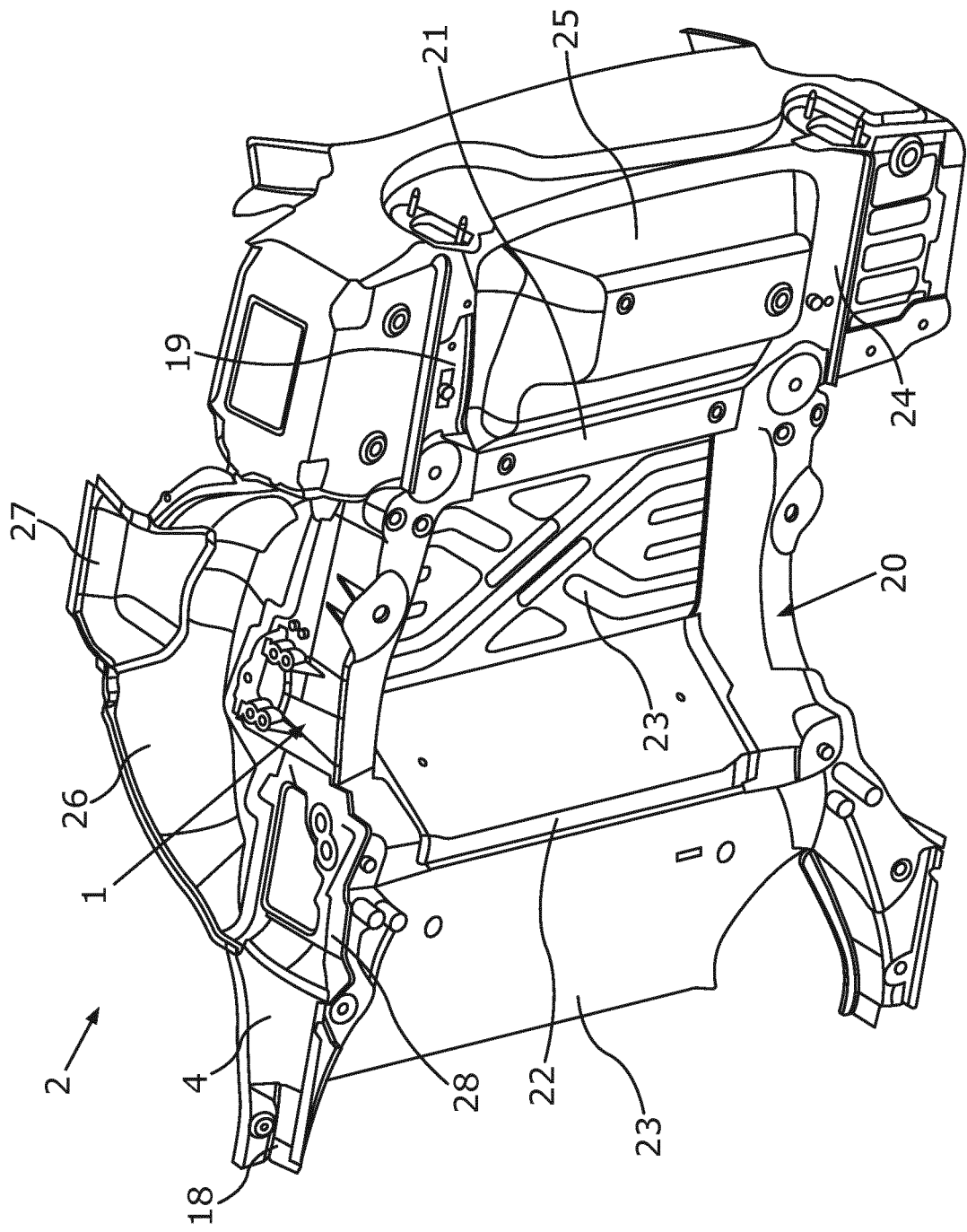
FIG. 2 shows the longitudinal member according to FIG. 1 and a further, correspondingly constructed longitudinal member in their respective installation location or installation position in the rear part of the motor vehicle.

With reference to FIG. 2, the incorporation of the longitudinal member 1 in the rear part 2 of the motor vehicle is to be explained, of which constituent parts or components are shown in FIG. 2 in a configuration that is exemplary and not restrictive. Thus, an attachment component 18 which is located in the region of a passenger compartment of the motor vehicle is fastened to the front end region 4 of the longitudinal member 1.

By contrast, the rear end region 3 of the longitudinal member 1 is adjoined by a rear longitudinal member 19 (cf.

FIG. 1), which in the present case is part of a crumple zone of the motor vehicle, which is formed in the region of the rear part 2.

Transversely to the longitudinal member 1 and toward a further longitudinal member 20 located opposite in the direction of the vehicle transverse axis y and which is constructed in a way analogous to the longitudinal member 1 shown in FIG. 1, there extend a rear transverse member 21 and a front transverse member 22. Furthermore, in the present case floor panels 23 of the rear part 2, of which only some are provided with a designation in FIG. 2 for reasons of clarity, are fastened to the longitudinal members 1, 20 and a respective one of the transverse members 21, 22.

A rear longitudinal member 24, which is fastened to a rear end of the longitudinal member 20 and which is likewise a part of the crumple zone of the motor vehicle, is preferably formed, as is also the other rear longitudinal member 19, as a sheet metal component produced in a shell design.

In the present case, a luggage compartment floor 25 is arranged between the rear longitudinal members 19, 24 which belong to the crumple zone and which, toward the rear, adjoin the longitudinal members 1, 20 formed as cast components. The luggage compartment floor 25, as shown by way of example in the present case, can have a recess for accommodating objects such as a spare wheel or, when the motor vehicle is designed as an electric vehicle or hybrid vehicle, a charging cable or the like.

Figure 3:
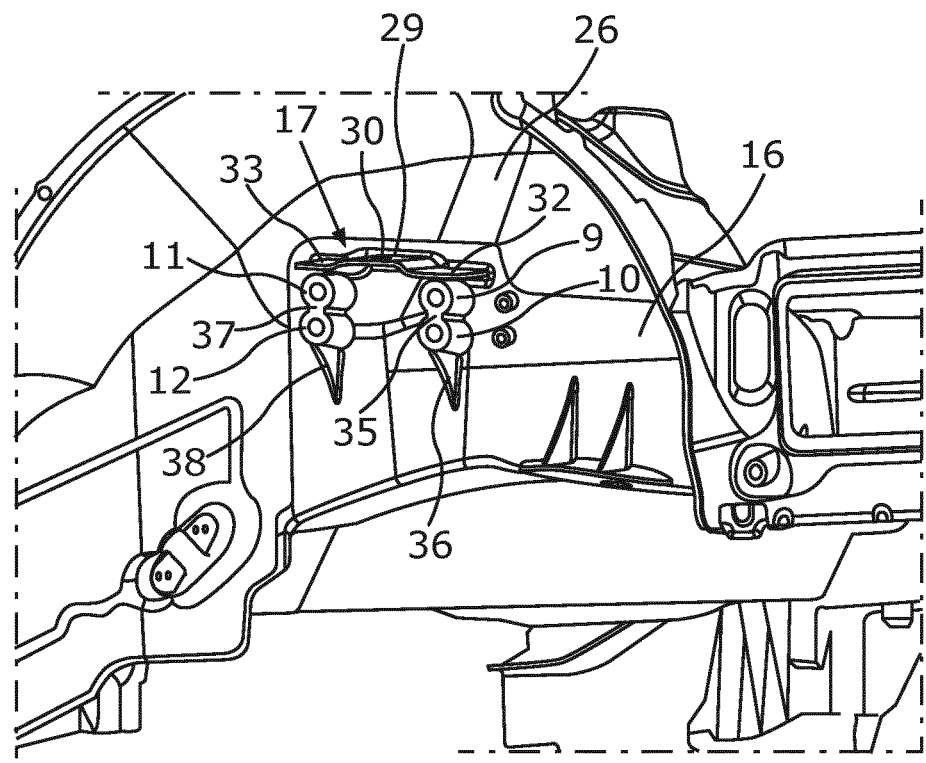
FIG. 3 shows the longitudinal member according to FIG. 1 in the region of a wheel arch of the motor vehicle, wherein, of the longitudinal member, an attachment region for the fastening of a mounting for a damper is shown.

It can further easily be seen from FIG. 2 that a wheel arch element in the form of a wheel arch panel 26, which is also shown as a detail in FIG. 3, is fastened to the left-hand longitudinal member 1 in the direction of travel during forward travel of the motor vehicle. In this regard, in particular from a combined view of FIG. 2 with FIG. 3, it can be seen that the support element 17 is spaced comparatively far apart from an upper end region 27 of the wheel arch panel 26 in the direction of the vehicle vertical axis z.

In the present case, the support element 17, which is formed as a plateau molded onto the side wall 16 of the longitudinal member 1, is even closer in the direction of the vehicle vertical axis z to a lower end region 28 of the wheel arch panel 26 than to the upper end region 27. As a result, the screw fastening points or fastening points in the form of the receiving bushes 9, 10, 11, 12 are very easily accessible when the wheel is removed from the wheel carrier 8 (compare FIG. 3 and FIG. 4).

In the present case, provision is preferably made that even when the wheel arch is completed by means of an outer wheel arch panel or the like wheel arch element mounted (not shown) on the wheel arch panel 26 from the vehicle outer side, the bolt heads 14 of the screw bolts 13 are nevertheless accessible as soon as the wheel has been disassembled or removed from the wheel carrier 8.

Provision can in particular be made here for the bolt heads 14 to be reachable by means of a screwing tool extending in the direction of the vehicle transverse axis y by the screwing tool being brought up to a respective bolt head 14 in the direction of the vehicle transverse axis y.

The good accessibility of the screw bolts 13 and of the receiving bushes 9, 10, 11, 12 is advantageous in particular for very simple assembly or fastening of the supporting bearing 6 in the attachment region 5 and thus also for the fastening of the damper 7 to the longitudinal member 1 and at the same time for corresponding removal.

In particular from a combined view of FIG. 1 with FIG. 3, it can be seen that the support element 17 has a plate-like central region 29 which, in the longitudinal direction of the longitudinal member 1 and thus in the installed position of the longitudinal member 1, is arranged parallel to the vehicle longitudinal axis x between the two receiving bushes 9, 10 arranged one above another in the vertical direction and the further two receiving bushes 11, 12 opposite these two receiving bushes 9, 10 in the longitudinal direction of the longitudinal member 1.

In the present case, the central region 29 has a passage opening 30, into which an extension 31 at the end of the damper 7 is inserted when the damper 7 is fastened to the longitudinal member 1 (compare FIG. 4 and FIG. 5) by means of the supporting bearing 6 in the attachment region 5.

In the direction of the vehicle longitudinal axis x and thus in the longitudinal direction of the longitudinal member 1, the central region 29 is adjoined by respective, likewise plate-like, edge regions 32, 33 of the support element 17. In this regard, it can be seen in particular from FIG. 3 that the central region 29 of the overall plate-like support element 17 can be arranged to lie somewhat higher in the vertical direction of the longitudinal member 1 and thus parallel to the vehicle vertical axis z than the adjacent edge regions 32, 33.

In other words, as shown above by way of example, the central region 29 can be shaped in the manner of a bulge of the support element 17 in the vertical direction of the same. In the region of this bulge of the support element 17 at the top, in the central region 29, an upper contact part 34 of the damper 7 is in contact with an underside of the support element 17 (compare FIG. 5). From the contact part 34, the pin-like extension 31 extends upward through the passage opening 30, as can be seen in particular from FIG. 4 and FIG. 5.

In particular from a view of FIG. 3 when viewed together with FIG. 5, it can easily be seen that the first plate-like edge region 32 is formed integrally with the upper of the two receiving bushes 9, 10 which, in the vertical direction of the longitudinal member 1, are arranged underneath this first edge region 32. Furthermore, from FIG. 3, in particular when viewed together with FIG. 5, it can easily be seen that these two receiving bushes 9, 10 arranged underneath the first edge region 32 are connected to each other or merge into each other in a contact region 35.

It can further be seen from FIG. 3 and from FIG. 4 that the lower receiving bush 10 of the two receiving bushes 9, 10 arranged underneath the first receiving region 32 is supported by means of a rib 36 on the side wall 16 of the longitudinal member 1. Here, the rib 36 extends in the vertical direction of the longitudinal member 1.

That which was explained in relation to the two receiving bushes 9, 10 formed integrally with the first edge region 32 applies in an analogous way to the two further receiving bushes 11, 12, which are formed integrally with the second edge region 33 and likewise merge into each other in a contact region 37. Furthermore, as shown by way of example in the present case, the lower receiving bush 12 of these two further receiving bushes 11, 12 arranged underneath the second edge region 33 can also be supported by means of a rib 38 on the side wall 16 of the longitudinal member 1. In the present case, this rib 38 also extends in the vertical direction of the longitudinal member 1.

From FIG. 4, in particular when viewed together with FIG. 5, it can be seen that the supporting bearing 6 has a plate part 39, in which there are formed passage openings for the shafts 15 of the screw bolts 13 (compare FIG. 5). With this plate part 39, the supporting bearing 6 rests on front faces of the receiving bushes 9, 10, 11, 12. Furthermore, the supporting bearing 6 comprises a holding part 40, which partly encloses and partly engages around an upper end region of the damper 7. The plate part 39 in the present case is formed integrally with the holding part 40.

The above-described structure of the supporting bearing 6 contributes to the fact that, by means of the screw bolts 13 screwed into the receiving openings of the receiving bushes 9, 10, 11, 12, it is possible to achieve very rigid and very load-bearing fixing of the supporting bearing 6 serving as a mounting for the damper 7 to the longitudinal member 1 in the attachment region 5. Consequently, the damper 7 can also be fixed in a very load-bearing manner to the longitudinal member 1 in the attachment region 5 by means of the supporting bearing 6.

It can also be seen from FIG. 5 that the receiving bushes 9, 10, 11, 12 in the present case have respective screw threads 41, in which corresponding screw threads that are formed on the shafts 15 of the screw bolts 13 engage.

Furthermore, in particular from the sectional illustration in FIG. 5, it can be gathered that in the attachment region 5, the longitudinal member 1 is very compact and at the same time has a great deal of material, which means that the very rigid attachment of the supporting bearing 6 to the longitudinal member 1 is supported.

Moreover, FIG. 5 reveals stiffening of the longitudinal member 1 in the attachment region 5 by a large number of ribs, which are formed integrally with the side wall 16 of the longitudinal member 1.

By means of the longitudinal member 1, in particular in the preferred configuration of the same as a cast component, a structural node is provided at which the damper 7 can be fixed in a robust and load-bearing manner by means of the mounting in the form of the supporting bearing 6. Here, the support element 17 ensures geometric support of the damper 7 in the vertical direction or in the direction of the vehicle vertical axis z.

The body-side attachment of the damper 7 is therefore in the present case integrated into a longitudinal structure of the rear part 2 that has to be provided in any case, specifically in the very compactly and robustly formed longitudinal member 1. Here, the damper 7 is fastened to the longitudinal member 1 in the transverse direction of the longitudinal member 1 and thus substantially parallel to the vehicle transverse axis y, preferably by screwing, as described above by way of example.

Consequently, in particular in the configuration described by way of example with reference to FIG. 1 to FIG. 5, the longitudinal member 1 forms a body structural node, which enables very robust and load-bearing lateral fixing of the damper 7 or a corresponding lateral damper attachment to the longitudinal member 1.

LIST OF DESIGNATIONS

1 Longitudinal member
2 Rear part
3 End region
4 End region
5 Attachment region
6 Supporting bearing
7 Damper
8 Wheel carrier
9 Receiving bush
10 Receiving bush
11 Receiving bush
12 Receiving bush
13 Screw bolt
14 Bolt head
15 Shaft
16 Side wall
17 Support element
18 Attachment component
19 Longitudinal member
20 Longitudinal member
21 Transverse member
22 Transverse member
23 Floor panel
24 Longitudinal member
25 Luggage compartment floor
26 Wheel arch plate
27 End region
28 End region
29 Central region
30 Passage opening
31 Extension
32 Edge region
33 Edge region
34 Contact part
35 Contact region
36 Rib
37 Contact region
38 Rib
39 Plate part
40 Holding part
41 Screw thread
x Vehicle longitudinal axis
y Vehicle transverse axis
z Vehicle vertical axis

The invention claimed is:

1. A longitudinal member for a rear part of a motor vehicle, comprising:
   an attachment region, in which a mounting for a damper device that dampens vibrations of a wheel of the motor vehicle is fastenable to the longitudinal member, wherein
   the attachment region has a plurality of fastening points for connecting elements,
   the fastening points have respective receiving openings, into which a respective section of one of the connecting elements is insertable to fix the mounting in the attachment region, wherein central axes of the receiving openings extend substantially in a transverse direction of the longitudinal member, and
   a support element of the longitudinal member, wherein the support element is arranged above the fastening points in a vertical direction of the longitudinal member, and on which support element the damper device is supportable in a lifting direction.

2. The longitudinal member according to claim 1, wherein the support element is formed integrally with the longitudinal member.

3. The longitudinal member according to claim 2, wherein the support element is formed integrally with the longitudinal member as a cast component.

4. The longitudinal member according to claim 1, wherein the support element has a plate-shaped central region which, in the longitudinal direction of the longitudinal member, is arranged between the fastening points.

5. The longitudinal member according to claim 4, wherein a passage opening, into which an extension at an end of the damper device is insertable, is formed in the central region.

6. The longitudinal member according to claim 1, wherein the receiving openings of the fastening points are formed in respective receiving bushes, which receiving bushes protrude from a side wall of the longitudinal member in the transverse direction of the longitudinal member.

7. The longitudinal member according to claim 6, wherein the receiving bushes are formed integrally with the longitudinal member.

8. The longitudinal member according to claim 7, wherein the receiving bushes each have a respective screw thread.

9. The longitudinal member according to claim 6, wherein the support element has plate-shaped edge regions, wherein a first edge region is supported on a first receiving bush, and a second edge region is supported on a second receiving bush.

10. The longitudinal member according to claim 9, wherein the first and second edge regions are formed integrally with the respective first and second receiving bushes.

11. The longitudinal member according to claim 9, wherein at least two of the receiving bushes connected to each other in a contact region are arranged one above another in the vertical direction of the longitudinal member, underneath the respective side edge region.

12. The longitudinal member according to claim 6, wherein at least one of the receiving bushes is supported via at least one rib on the side wall of the longitudinal member.

13. A rear part for a motor vehicle, comprising:
    at least one longitudinal member according to claim 1; and
    a wheel arch, which is fastened to the longitudinal member, wherein,
    in a direction of a vehicle vertical axis, the support element of the longitudinal member is spaced further apart from an upper end region of the wheel arch than from a lower end region of the wheel arch.

* * * * *